Jan. 18, 1955

M. G. GUIETTE 2,699,797

SIPHONING DEVICE FOR LIQUIDS

Filed May 15, 1950

INVENTOR.
MAURICE GEORGES GUIETTE
BY Wenderoth, Lind & Ponack
ATTORNEYS

United States Patent Office 2,699,797
Patented Jan. 18, 1955

2,699,797

SIPHONING DEVICE FOR LIQUIDS

Maurice Georges Guiette, Aartselaar, Belgium

Application May 15, 1950, Serial No. 161,988

Claims priority, application Belgium May 17, 1949

3 Claims. (Cl. 137—151)

This invention relates to a siphoning device for liquids, comprising a duct, a branch of which may be directed towards a receptacle, while the other branch plunges in the liquid to be siphoned.

The previously used siphons of this type are generally difficult to use since they require priming in order to maintain the liquid in the duct when the siphon is transferred from one receptacle to another one. The siphons are usually primed in a primitive manner. This constitutes a real danger for the user of the siphons where the liquids are corrosive. Some flexible siphons may be primed by sucking up the liquid into the duct but such a proceeding may not be used in each case when the liquid to be used is not an edible one, such as milk, wine, and so on. There are of course still many other ways for filling a flexible pipe designed for being used as a siphon, and for simultaneously closing both its ends until one of these, after having been placed into a receptacle, may be released for delivering the liquid. These manners of priming a siphon, however various and numerous they may be, only give rise to contaminated delivered liquid and to hazards in the handling of corrosive liquids.

The invention has for its object to overcome with these drawbacks and to provide a siphoning device which can be primed without requiring the handling of the liquid to be siphoned.

With this object in view, the branch of the duct which plunges into the liquid to be siphoned, is inserted into a cylindrical chamber, which may be connected on the one hand with a reservoir designed for containing a priming liquid and on the other hand with the liquid to be siphoned, while a member movable in said chamber may obturate or uncover openings connecting said chamber and said duct with the reservoir containing the priming liquid or with the receptacle containing the liquid to be siphoned.

According to an advantageous embodiment of the invention, the movable member in said chamber consists of a hollow piston which may move along the axis of said chamber and which has on the one hand a projecting part capable of obturating the opening of communication with the reservoir containing the priming liquid, and on the other hand at its opposite end at least one side opening in a projection from said chamber for connecting the latter and the duct with the recipient containing the liquid to be siphoned.

In the same embodiment, the opening for connecting the cylindrical chamber with the reservoir for the priming liquid consists of a hole the axis of which coincides with the axis along which the piston moves, said opening having a flange disposed at an angle with the piston axis, while the projecting part of said piston has an edge which is cut according to the same angle.

In accordance with another feature of the invention, the above mentioned piston has at least a second projecting part for guiding its stroke inside the chamber said chamber having along its inner wall at least one channel to allow the liquid above the aforesaid projecting part to flow towards the lower part of the chamber.

The invention relates moreover to a closing means to cut off the liquid feed to the receptacle being filled at a moment which may be determined, generally when the receptacle is filled.

This invention thus relates to a siphoning device for liquids comprising a duct a branch of which may be directed towards a receptacle, while the other branch plunges into the liquid to be siphoned, means being provided on one hand for connecting said duct with a chamber which communicates with a reservoir arranged at a level higher than the upper point of the above-mentioned duct, said reservoir being designed for containing a priming liquid, and on the other hand for connecting said chamber and said duct with the liquid to be siphoned.

According to an advantageous embodiment, the above-mentioned means consist of an appliance causing the axial movement in said chamber of a connecting piece having, at its lower part, on the one hand, a set of holes by means of which the lower opening of said cylindrical chamber may be obturated or uncovered and, on the other hand, a seat on which the bottom or base of said duct may rest, the latter being axially movable inside the connecting piece.

Other features and details of the invention will become apparent from the description of an embodiment given herein after by way of non-limitative example, with reference to the accompanying drawing.

Figure 2:
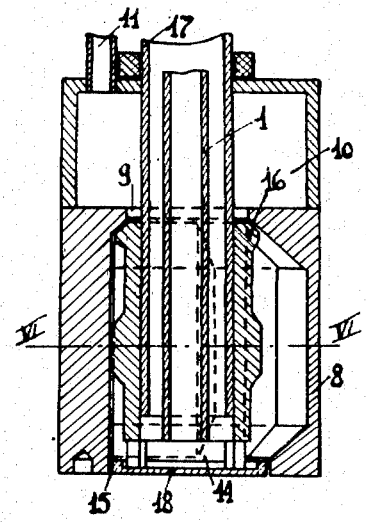
Fig. 2 is a sectional view of the appliance in the closed position.
Figure 3:
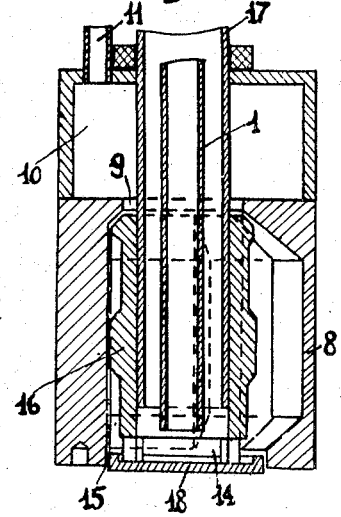
Fig. 3 is a sectional view of the appliance shown during the priming period.
Figure 1:
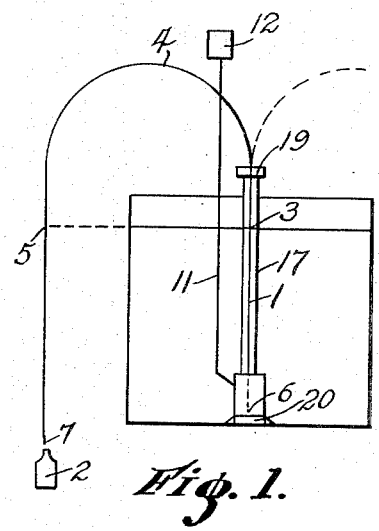
Fig. 1 shows diagrammatically a device with an appliance according to the invention.

As shown in Figs. 1 and 2 the flexible duct 1 enters the liquid being siphoned and is in the form of a knee above the level of the liquid so that the outlet end of the tube is directed to empty the liquid into the receptacle 2 in order to siphon the liquid into receptacle 2, the curve formed by the duct above the points diagrammatically shown in Fig. 1 by 3, 5 must be overcome.

If said curve has been overcome a first time, namely during the priming period, it will only be necessary to close in due course ends 6, 7 of the duct, while receptacle 2 is being substituted by a further receptacle. In this way a plurality of receptacles may be filled by means of a single siphoning duct, when care is taken that the siphon does not become unprimed during these operations.

A stopping means is provided which comprises, in addition to duct 1, a cylindrical (priming) chamber 8, into which an end of the duct opens. At its upper part, the priming chamber has a circular opening 9, coaxial with the axis along which the piston moves in the chamber. Said opening is in fact a gate-valve between the inside of chamber 8 and a chamber 10 located above the latter, which chamber 10 may thus be connected with duct 1, which opens in chamber 8. The upper part 10 of cylindrical chamber 8 is provided with a packing between chamber 10 and rigid sheath 17. A duct 11 connecting up the priming chamber and a reservoir 12 also enters chamber 10. In said reservoir 12, there may be poured a quantity of liquid equivalent to this required for the priming operation.

Opening 15, provided in the cylindrical chamber at the end opposed to this which receives orifice 9, is obturated also with an end of piston 16. In closed position, such as shown in Fig. 2, opening 9 and opening 45 are hermetically closed and no liquid enters the chamber, either towards duct 1 or from duct 11 and reservoir 12.

Figure 4:
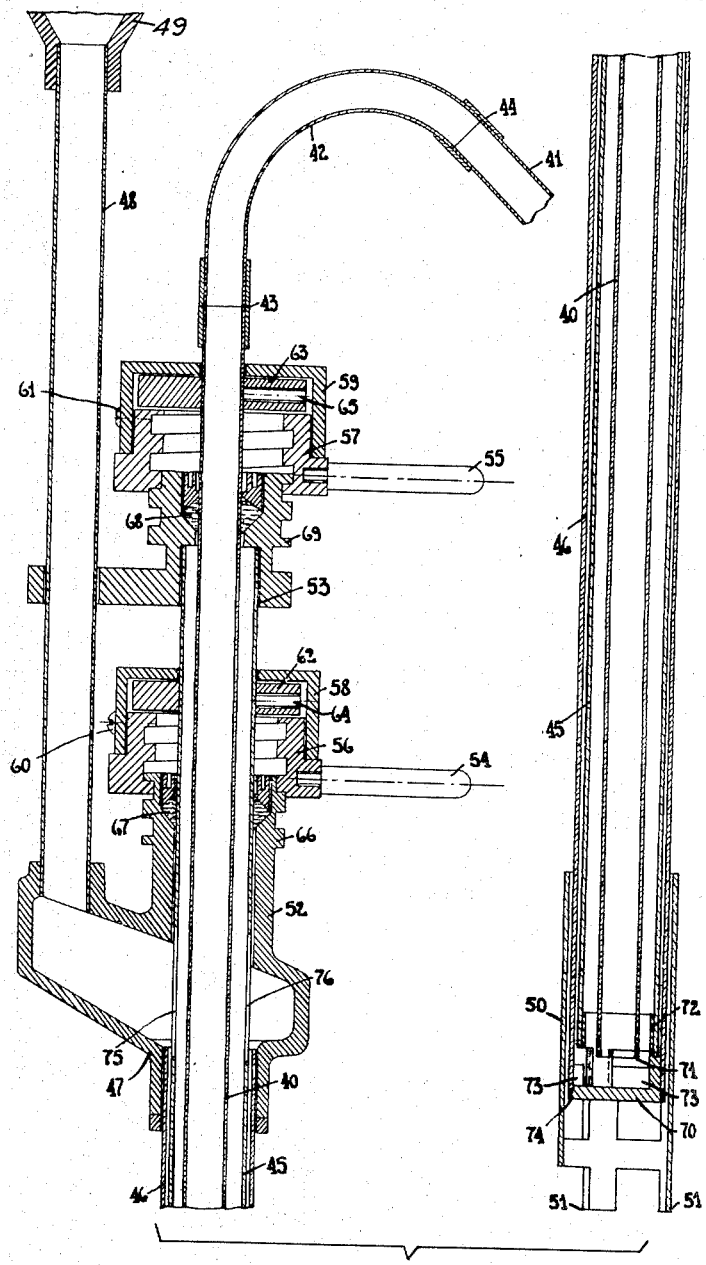
Fig. 4 shows, in section along the longitudinal axis, a preferred embodiment of the device according to the invention.

The device shown in Fig. 4 comprises a duct including a branch 40, which plunges into the liquid to be siphoned, and a long branch, 41, which may be directed towards the receptacle, both branches being able to be connected through a knee 42, by means of rings 43 and 44. The duct branch 40 is joined to a connecting piece 45, which is guided in the cylindrical chamber 46. The cylindrical chamber 46 is open at its lower part to form a passage for the liquid to be siphoned and at its upper part opens into the ring-shaped member 47, to which a branching duct 48 is joined. Duct 48 leads into the reservoir 49 for the priming liquid. The reservoir must be located at a point higher than any point of the knee 42.

The base of cylindrical chamber 46 is disposed in sleeve 50 in such manner as to prevent the base of the cylindrical chamber from coming into contact directly with the settlings which may be in the bottom part of the liquid to be siphoned during use. Said sleeve is of course perforated and rests on a number of projecting supports 51 on the bottom of the receiver containing the liquid to be siphoned.

A rapid pitch mechanism is mounted on sleeve 52 and is fitted with extending ring-shaped member 47, the mechanism being arranged to lower and raise connecting piece 45. A similar heavy friction mechanism on the upper end of the connecting piece, 45 is the mechanism 53, which imparts to duct 40 the same kind of raising and lowering movement. These mechanisms 45 and 53 may be actuated by means of handles 54, 55, mounted on screwed sleeves 56, 57 made integral with casings 58, 59 respectively, by means of screws 60, 61. Inside of the casings 58, 59, nuts 62, 63 are further secured by means of the screws 64, 65. Where the connecting piece 45 passes through the threaded sleeve 66, a packing 67 is provided. A similar packing 68 is arranged inside threaded sleeve 69, where branch 40 of the central duct passes through.

The free end or base of connecting piece 45 has a set of holes and a plate 70 forming a seat on which free edge 71 of branch 40 of the central duct may rest. Properly speaking, holes 73 in the base of connecting piece 45 are made in a ring 72 arranged inside the connecting piece 45.

The operation of the siphoning device is simple and is described as follows: Before inserting cylindrical chamber 46 of the device into the liquid to be siphoned, connecting piece 45 is lowered by turning handle 54; at this time, plate 70 no longer rests against free edge 74 of cylindrical chamber 46 and the liquid to be siphoned enters into the annular space between branch 40 of the central duct and connecting piece 45. This annular space is filled up to the level of the liquid in the receptacle which is to be siphoned. When branch 40 of the central duct is then raised, the liquid will flow inside the latter and will reach the same level as the liquid in the receptacle.

These first operations are not quite necessary but they allow a substantial amount of liquid to be saved, which amount is taken from reservoir 49.

The next operation is the lowering of branch 40 of the central duct so that free edge 71 rests on plate 70; connecting piece 45 is then raised up in order that edge 74 of cylindrical chamber 46 closely contacts the chamfered edge of said plate 70. When the device is in this position, there is no passage of liquid from the outside to the inside of the connecting piece nor from the annular space between branch 40 and connecting piece 45 the inside of branch 40. All of these circuits being closed, an amount of liquid is poured into reservoir 49, which amount of liquid enters the ring-shaped member 47 through duct 48 and enters through openings 75, 76 in the wall of the connecting piece, at the level of ring-shaped member 47. The liquid enters into the space between branch 40 of the central duct and connecting piece 45. The liquid fills up said ring-shaped space approximately to the level of packing 68, while a space subsists free of liquid due to the fact that air may be present in said space and serve as a cushion.

For starting the device, it is only necessary to raise branch 40 of the central duct, which results in forcing the liquid into knee 42, over said knee and into duct 41. Just after this, connecting piece 45 is lowered which releases the lower opening of cylindrical chamber 46, the liquid flowing from the receptacle being siphoned into the individual receptacles being filled.

For maintaining the device in its primed position, it will only be necessary to again apply free edge 71 of branch 40 onto plate 70, without obturating the lower opening of cylindrical chamber 46. The free end of branch 41, which reaches the said individual receptacles may be provided with any obturating device known per se for maintaining the necessary amount of liquid in the circuit formed with branch 40, second branch 41 and knee 42.

It is to be understood that the above described embodiment does not limit the scope of the invention and that many alterations could be made namely as to the shape, the number, the arrangement and composition of the various elements of the device, without departing from the spirit of the present invention.

I claim:

1. A siphoning device for liquids comprising a duct including a short branch which plunges into the liquid to be siphoned, a long branch constructed and arranged for delivery and a knee connecting these two branches, a reservoir above the knee holding the priming liquid for the siphoning device, a chamber situated partially above the lower end of the short branch, said chamber open at its lower part to form a passageway for the liquid being siphoned, communicating means between said reservoir and said chamber for delivery of the priming liquid, a sleeve connecting piece inside said chamber and surrounding said short branch which provides an annular passageway joining said chamber with the receptacle containing the liquid to be siphoned, a plate forming a seat at the bottom of said connecting piece and rigidly fixed to said connecting piece, openings provided at the bottom of said connecting piece, and means for displacing the connecting piece with respect to the chamber into a position in which said plate obturates the lower end of said chamber.

2. A device as in claim 1 provided with ring displacing means for regulating the height of the short branch with respect to the sleeve connecting piece up to a position in which the plate is in contact with the lower extremity of the short branch.

3. A device as in claim 1 provided with a ring member arranged inside the sleeve connecting piece, said ring member provided with holes through which the siphoned liquid passes.

References Cited in the file of this patent

UNITED STATES PATENTS

| Number | Name | Date |
|---|---|---|
| 125,559 | Fox | Apr. 9, 1872 |
| 339,127 | Arper | Apr. 6, 1886 |
| 673,546 | Nye | May 7, 1901 |
| 687,395 | Douglas | Nov. 26, 1901 |
| 849,843 | Hughes | Apr. 9, 1907 |
| 915,867 | Lee | Mar. 23, 1909 |
| 1,181,820 | Young | May 2, 1916 |
| 1,716,544 | Felton | June 11, 1929 |
| 1,731,899 | Huntworth | Oct. 15, 1929 |
| 1,926,343 | Lucke | Sept. 12, 1933 |
| 2,131,743 | Loughridge | Oct. 4, 1938 |
| 2,307,324 | Larson | Jan. 5, 1943 |
| 2,387,483 | Walbert | Oct. 23, 1945 |